United States Patent [19]

West

[11] 4,062,580
[45] Dec. 13, 1977

[54] FENDER TRIM APPARATUS FOR VEHICLES

[76] Inventor: Norvel P. West, 7022 S. Shore Drive, Chicago, Ill. 60649

[21] Appl. No.: 706,002

[22] Filed: July 16, 1976

Related U.S. Application Data

[63] Continuation-in-part of Ser. No. 556,302, March 7, 1975, abandoned.

[51] Int. Cl.² ............................................. B62D 25/16
[52] U.S. Cl. ................................... 293/62; 280/153 R
[58] Field of Search .......... 293/62; 280/153 R, 153 B, 280/153 A

[56] References Cited

U.S. PATENT DOCUMENTS

| | | | |
|---|---|---|---|
| 1,954,919 | 4/1934 | Carby | 280/153 R |
| 2,119,429 | 5/1938 | Fletcher | 293/62 |
| 2,671,672 | 3/1954 | Schatzman | 280/153 R |
| 3,584,898 | 6/1971 | Pearson | 280/153 R |

Primary Examiner—Trygve M. Blix
Assistant Examiner—D. W. Keen
Attorney, Agent, or Firm—Alter and Weiss

[57] ABSTRACT

A flanged automotive trim apparatus for attachment to the fender wheel-well of a vehicle so as to replace the vehicle's removable rear wheel-well cover in a more desirable fashion. A device at the top of the trim apparatus engages and locks the vehicle's upper mounting feet. Offset seating rods located at the bottom front and rear portions of the trim apparatus engage and lock the vehicle's lower mounting feet.

8 Claims, 8 Drawing Figures

FENDER TRIM APPARATUS FOR VEHICLES

BACKGROUND OF THE INVENTION

This is a continuation-in-part of my earlier application filed Mar. 7, 1975, and having Ser. No. 556,302, now abandoned.

My invention relates generally to vehicular styling accessories and more particularly to a wheel-well trim apparatus and mounting bracket arrangement for attaching this trim accessory to the body of a vehicle.

DESCRIPTION OF THE PRIOR ART

In recent years, many products have been developed in the emerging field of vehicular and especially automotive body enhancement products. Current examples of this prior art include such devices as stainless steel rocker panel moldings, either custom fitted or adjustable and telescoping, chrome-plated rear fender pebble deflectors, rear fender stainless steel gravel shields, window channel kits, stainless steel splash guards, stainless steel door visors and door edge moldings, flexible plastic car door edging which must be cut to size, flexible vinyl molding for the side of the car, and flexible plastic fender well moldings in a chrome-like finish.

Most of these have sought to provide for the owner of an automobile various advantages, including improved styling, protection of the vehicle's body from thrown stones or pebbles, resistance to rust and the elements, reinforcement or guarding of the vehicle's body surface to resist dents, or improvements in the form of additional safety features. The majority of these previous products have attempted to secure one or more of these advantages while at the same time offering ease in installation, secure fit, durable construction, reasonable cost and interchangeability of product.

Of the several known devices designed and marketed for these specific purposes, few, if any, achieve more than one of the advantages sought and often remain difficult to install, poorly fitted, nor are durable, reasonably priced, or interchangeable.

For the owners of vehicles which presently have wheel-well covers, or while not having such covers, still have the mounting mechanism to hold said covers, these problems have been eliminated with the present invention which permits a secure and exact fit, durable wear, and interchangeability while offering many features of safety, styling enhancement, and body protection. This is achieved through a novel method of installation requiring no boring or adulteration of the vehicle's existing body structure by rather utilizing the present mounting appendages already provided by said vehicle.

SUMMARY OF THE INVENTION

The present invention relates to an automotive trim device comprising a chrome and/or painted, flanged, fender trim apparatus and means for mounting the apparatus securely and closely to the quarter fender panels of vehicles presently having wheel-well covers and the necessary mounting hardware, or onto vehicles lacking the wheel-well covers but still having wheel-well mounting hardware. The flanged construction of the invention allows firm engagement with the vehicle's rear quarter fender panel while exposing a substantial portion of the chromium edge of the fender trim invention. The loci of points described by the radius of the exposed flange matches closely the curvature of the rear quarter fender's arched wheel-well. Mounting members of the lower front side of said invention and the lower rear side of said invention engage and lock into the mounting feet located on the lower front portion of the rear wheel-well and the lower rear portion of the rear wheel-well respectively, both being located on the internal side of the vehicle's fender panel.

It is an object of the present invention to allow styling conversion of a vehicle presently having wheel-well covers or a vehicle lacking wheel-well covers while still possessing the mounting hardware for said wheel-well covers, to a vehicle having the latest styling feature of no wheel-well covers but rather a finished chrome trim edging around the wheel-well. The styling effect is that of a professionally manufactured and fitted chrome and/or painted molding which surrounds the well for styling purposes.

It is another object of the present invention to protect the vehicle's paint against chipping from thrown pebbles and stones in the course of driving, to facilitate washing, tire changing, and waxing of the vehicle while protecting the arms and hands of the owner from exposure to unfinished metal and the dangers of cuts and lacerations, to provide replacement at reasonable cost for original equipment wheel-well covers when the originally provided cover is damaged, and to aid in protecting exposed metal from the elements and thus delay the effects of rust on the metal.

Additionally, it is an object of the present invention to provide these advantages while attaching and installing as easily and quickly as the original wheel-well cover being replaced, utilizing the original manufacturer's installation and locking devices. The present invention will similarly allow interchangeability between various models of a manufacturer's vehicular line while providing an unobvious alternative to the use of conventional plastic molding and the cutting, hand tailoring, poor fit, and poor wearability associated with such plastic molding.

These and other objects of the invention will become apparent from reference to the following description, claims and attached drawings.

DETAILED DESCRIPTION

Figure 1:
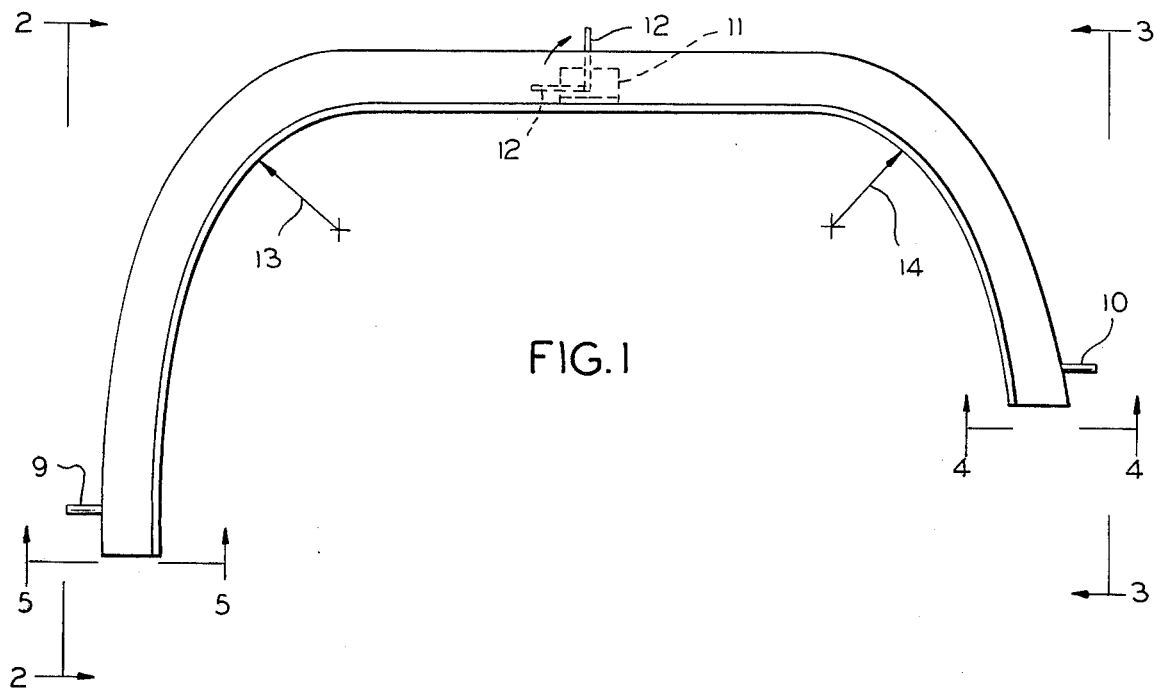
FIG. 1 of the drawings shows a side elevational view of the fender trim apparatus with its mounting assembly to install said apparatus.

While this invention is susceptible of embodiments in many different forms, there is shown in the drawings and will herein be described in detail one specific embodiment with the understanding that the present disclosure is to be considered as an exemplification of the principles of the invention and is not intended to limit the invention to the embodiment illustrated.

In front view of the fender trim apparatus shown in FIG. 1, the outer flange of the invention is exposed as it would be when completely installed on the wheel-well of a vehicle. Lower front rod 9 and lower rear rod 10 during installation are inserted in the mounting feet located on the interior side of the fender of the vehicle. Once seated in these mounting feet, the apparatus is rotated until sealing latch 11 comes in contact with the mounting means located on the upper inner perimeter of the wheel-well of said vehicle. Completion of installation is attained when pivotal member 12 is rotated behind an upper mounting foot on the interior side of the fender locking the invention into place. Radii of curvature 13 and 14 have been preshaped in the invention to closely follow the curvature of said vehicle's fender wheel-well.

Figures 2, 3, 4, 5:
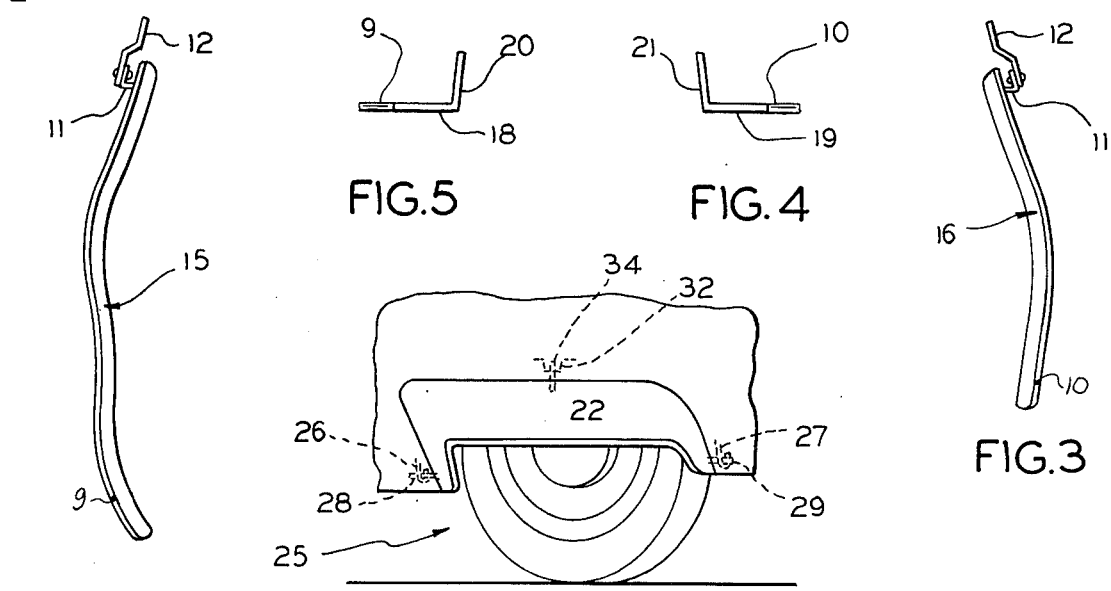
FIG. 2 is a front side view taken along lines 2—2 looking in the direction of the arrows.
FIG. 3 is a rear side view taken along lines 3-3 and looking in the direction of the arrows.
FIG. 4 is a bottom front view taken along lines 4—4 and looking in the direction of the arrows.
FIG. 5 is a bottom rear view taken along lines 5—5 and looking in the direction of the arrows.

The front view of the fender trim apparatus, FIG. 2, shows outer exposed flange portion 15 shaped to the vehicle's fender curvature. Seating rod 9 originates on the inner flange portion at the lower portion and protrudes out to engage and lock into the mounting foot presently existing on the inner fender of said vehicle. The rear side view shown in FIG. 3 illustrates outer exposed portion 16 which is similarly shaped to follow the fender curvature of the vehicle. Lower rear rod 10 engages and locks into the mounting foot already existing on lower rear inner fender of said vehicle.

The flanged shaping of the apparatus is shown in FIGS. 4 and 5 with portions 20 and 21 exposed to the outer surface of the vehicle by tracing the perimeter of the wheel-well while portions 18 and 19 follow the perimeter of the wheel-well on the interior side of the fender to be hidden from view.

Figure 6:
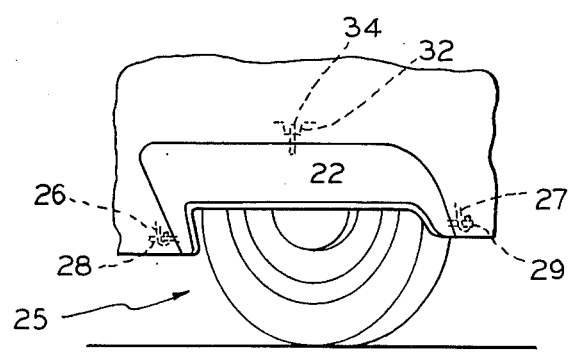
FIG. 6 is a side perspective view of a vehicle incorporating the use of a conventional wheel-well cover.
Figures 7, 8:
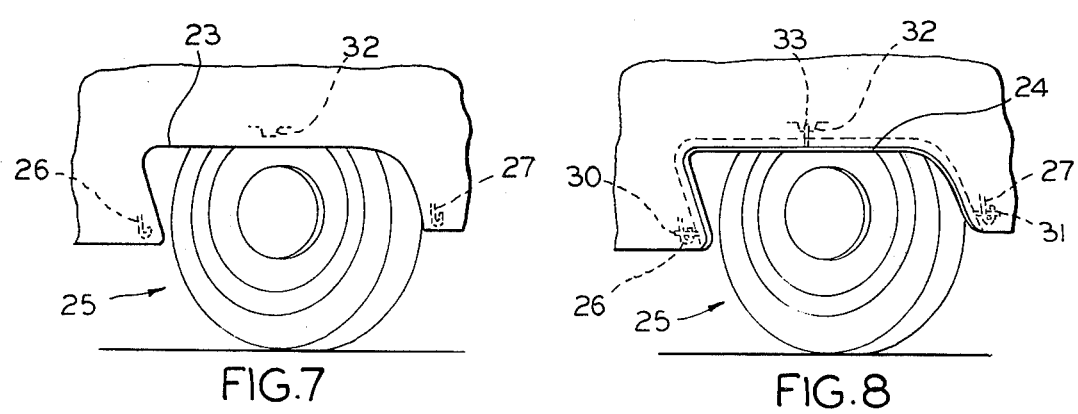
FIG. 7 is a side perspective view of a vehicle with the wheel-well cover of FIG. 6 removed.
FIG. 8 is a perspective view of a vehicle incorporating the present invention in place of its wheel-well cover.

A schematic representation in perspective of a vehicle having the invention installed is shown in FIGS. 6, 7 and 8. FIG. 6 illustrates wheel-well covering 22 in place on a vehicle over the wheel-well, partially hiding the rear wheel 25 from view. FIG. 7 shows the same vehicle after removal of the wheel-well covering from the wheel-well with bare metal now describing the perimeter around the wheel-well 23. FIG. 8 illustrates the present invention in place about said perimeter of the wheel-well displaying outer decorative edge of the invention 24. Invention 24 is secured in place by positioning lower rods 30 and 31 within feet 26 and 27 and member 33 into foot 32.

In operation, to utilize the device of the present invention, it is contemplated that the fender trim apparatus would be placed perpendicular to vehicle and removed in towards the wheel-well after the wheel-well cover has been removed. At that time, installation rods 9 and 10 would be elevated and inserted into mounting feet on the inner fender of the vehicle. The entire apparatus would then be rotated 90° until pivotal locking device 12 comes close to the securing tab-like upper mounting foot already existing on the inside of the vehicle's fender. When the entire device is parallel to the exterior fender of said vehicle, the installer rotates pivotal member 33 until the entire apparatus locks into place. At this point, the complete outer exposed flange is closely surrounding the fender wheel-well periphery while the interior flange is securing the juxtaposed invention to the interior side of the fender proximate to the wheel-well.

The foregoing description and drawings merely explain and illustrate the invention and the invention is not limited thereto, except insofar as the appended claims are so limited, as those skilled in the art who have the disclosure before them will be able to make modifications and variations therein without departing from the scope of the invention.

What is claimed is:

1. An automotive trim device which replaces a vehicle's wheel-well covers by installation into the vehicle's wheel-well cover mounting feet, said device comprising:

a flanged and shaped fender trim apparatus, said apparatus including a continuous inner flange portion positioned behind a fender panel of said vehicle in a position juxtaposed to the interior side of said fender panel proximate to said vehicle's wheel-well opening, said inner flange portion curving behind said fender panel to said juxtaposed position and a substantially thin flat outer exposed flange portion emanating from and substantially normal to said inner flange portion which outlines the perimeter of said fender at said wheel-well opening with an exposed edge projecting substantially proximate to the exterior side of said fender panel; and means for mounting said apparatus securely juxtaposed to the fender panels of the vehicle in cooperation with said vehicle's wheel-well cover attachment apparatus thereby providing trim for said vehicle along the inner perimeter of said vehicle's fender wheel-well opening.

2. The invention according to claim 1, and:
said apparatus is metallic and has a finish such that the outer flange surface decorates the perimeter of said wheel-well opening.

3. The invention according to claim 1, in which the mounting means comprises:

a. front lower attachment means protruding from the lower front of said trim apparatus behind the inner fender panel of the vehicle to engage and rotate within a first mounting foot provided on the interior side of said fender panel forward of said wheel-well opening;

b. a rear lower attachment means protruding from the lower rear of said trim apparatus towards and behind the inner fender panel of the vehicle to engage and rotate with a second mounting foot provided on the interior side of said fender panel behind said wheel-well opening;

c. an upper middle attachment means entirely above said outer flange member for securing said trim apparatus juxtaposed to said interior side of said vehicle's fender thereby completing secure installation of the trim apparatus to said vehicle.

4. The invention according to claim 3, in which said front lower attachment means comprises a front lower seating rod emanating from the front of said inner flange portion of said fender trim apparatus and protruding behind the interior side of said panel of said vehicle.

5. The invention according to claim 3, in which the rear lower attachment means comprises a rear lower seating rod emanating from the rear of said inner flange portion of said fender trim apparatus and protruding behind the interior side of said fender panel of said vehicle.

6. The invention according to claim 3, in which the upper middle attachment means comprises an upper pivotal member attached to the top of said inner flange portion and extending away from said top, said pivotal member having a locking position for locking said apparatus juxtaposed to the fender panel, and a releasing position for installation and removal of said fender trim apparatus.

7. The invention according to claim 6, in which said upper pivotal member attached to the top of said inner flange portion can be rotated between the locking position and the releasing position, said locking position occurring with said member rotated to a substantially vertical position to engage an upper mounting means provided on the inside of the fender wheel-well, and said releasing position occurring with said member rotated to a substantially horizontal position thereby disengaging said upper mounting means to release the top of said fender trim apparatus from its secured juxtaposed position and to enable rotation of said fender trim apparatus to occur around the front lower and rear lower mounting means for removal of said apparatus, and in a reverse manner enabling installation of said fender trim apparatus towards the final locked vertical positioning of said pivotal member.

8. The invention according to claim 1, in which said fender trim apparatus is shaped and flanged, being shaped to match the curvature of the wheel-well of the particular vehicle upon which said device is being installed so as to follow and enable installation in a juxtaposed position to the perimeter of said fender at said wheel-well with the cross-section of said apparatus being formed into a substantially L-shaped flange with the vertical member of said L-shape the inner portion of said flange and the horizontal member of said L-shaped flange the outer exposed portion of said flange.

* * * * *

UNITED STATES PATENT AND TRADEMARK OFFICE
CERTIFICATE OF CORRECTION

PATENT NO. : 4,062,580
DATED : December 13, 1977
INVENTOR(S) : Norvel P. West

It is certified that error appears in the above-identified patent and that said Letters Patent are hereby corrected as shown below:

Col. 3, Line 4: After the first word "In " add --the--.

Col. 3, Line 53: After "and" delete "re-".

Signed and Sealed this

Fourth Day of April 1978

[SEAL]

Attest:

RUTH C. MASON
*Attesting Officer*

LUTRELLE F. PARKER
*Acting Commissioner of Patents and Trademarks*